(12) United States Patent
Daval

(10) Patent No.: US 10,189,316 B2
(45) Date of Patent: Jan. 29, 2019

(54) ROLLING ASSEMBLY COMPRISING A TIRE, A RIM AND AN ADAPTER

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Bertrand Daval, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 92 days.

(21) Appl. No.: 15/307,630

(22) PCT Filed: Mar. 17, 2015

(86) PCT No.: PCT/EP2015/055503
§ 371 (c)(1),
(2) Date: Oct. 28, 2016

(87) PCT Pub. No.: WO2015/165638
PCT Pub. Date: Nov. 5, 2015

(65) Prior Publication Data
US 2017/0057299 A1   Mar. 2, 2017

(30) Foreign Application Priority Data

Apr. 29, 2014 (FR) ...................... 14 53853

(51) Int. Cl.
*B60C 15/02* (2006.01)

(52) U.S. Cl.
CPC .......... *B60C 15/0203* (2013.01); *B60C 15/02* (2013.01); *B60C 15/0209* (2013.01); *B60C 15/023* (2013.01)

(58) Field of Classification Search
CPC . B60C 15/02; B60C 15/0203; B60C 15/0206; B60C 15/0209; B60C 15/0213
See application file for complete search history.

(56) References Cited

U.S. PATENT DOCUMENTS

| 4,373,567 A | 2/1983 | Declercq |
| 4,408,379 A * | 10/1983 | Kusano ................. B21D 53/30 |
| | | 29/894.353 |

(Continued)

FOREIGN PATENT DOCUMENTS

| CN | 103038070 | 4/2013 |
| WO | WO 00/78565 | 12/2000 |
| WO | WO 2017/092928 | * 6/2017 ......... B60C 15/0203 |

OTHER PUBLICATIONS

Office Action dated May 27, 2017 which issued in the corresponding Chinese Patent Application No. 2015800205165.

*Primary Examiner* — Jason R Bellinger
(74) *Attorney, Agent, or Firm* — Cozen O'Connor

(57) ABSTRACT

Adapter coupled between a tire bead and a rim, and having an axially inner end mounted on the rim seat. The adapter comprises an inner reinforcer, an axially outer end that comprises an outer reinforcer, and a body that connects the outer and inner ends to form a single piece and comprises one main reinforcement that connects the outer and inner reinforcers. Substantially cylindrical adapter seat receives one of the tire beads, the seat being situated at the axially outer end of the body. An adapter bearing face is substantially contained in a plane perpendicular to the axis of rotation of the tire/rim rolling assembly, the bearing face being situated on the axially inner face of the axially outer end. The reinforcing element of the axially outer end is axially situated entirely on the outside of the bearing face. The body comprises, facing the adapter seat, an annular seat reinforcement.

11 Claims, 2 Drawing Sheets

(56) References Cited

U.S. PATENT DOCUMENTS

| | | | |
|---|---|---|---|
| 6,626,217 B2* | 9/2003 | Bestgen | B60B 25/18 152/379.4 |
| 2013/0175849 A1 | 7/2013 | Schmidt et al. | |
| 2016/0311255 A1* | 10/2016 | Ahouanto | B60O 15/0213 |
| 2018/0141374 A1* | 5/2018 | Barguet | B60C 15/0209 |

* cited by examiner

ROLLING ASSEMBLY COMPRISING A TIRE, A RIM AND AN ADAPTER

RELATED APPLICATIONS

This is a U.S. National Phase Application under 35 USC 371 of International Application PCT/EP2015/055503 filed on Mar. 17, 2015.

This application claims the priority of French application no. 1453853 filed Apr. 29, 2014, the entire content of which is hereby incorporated by reference.

FIELD OF THE INVENTION

The invention relates to a rolling assembly formed mainly of a tire and a rim.

DEFINITIONS

A reminder of the definitions used in the present invention is given below:
- "axial direction": direction parallel to the axis of rotation of the tire,
- "radial direction": direction intersecting the axis of rotation of the tire and perpendicular thereto,
- "circumferential direction": direction perpendicular to a radius and comprised in a plane perpendicular to the axis of rotation of the tire,
- "radial section": section in a plane containing the axis of rotation of the tire,
- "equatorial plane": plane perpendicular to the axis of rotation and which passes through the middle of the tread.

BACKGROUND OF THE INVENTION

In order to reduce carbon dioxide gas emissions of motor vehicles, manufacturers are looking to reduce the mass of these vehicles and also the rolling resistance of the tires fitted thereto. This rolling resistance can be reduced by increasing the outside diameter of the tires and therefore that of the wheels.

However, that leads to an increase in the mass of the wheel and therefore that of the vehicle.

Hence, one known solution is to use materials that are more lightweight than steel to make the rim, such as aluminium alloys. However, such rims, while they are more lightweight and have a more open visual appearance thus making it easier for the heat of the brakes to be dissipated, are not sufficiently resistant to knocks such as potholes and/or knocks against kerbs.

Specifically, the knocks experienced by such rolling elements may cause one or more of the components of the rolling element (the tire and/or the rim) to break.

Thus there is still a need for a rolling assembly that is more lightweight than rolling assemblies with steel rims, and which exhibits better resistance to knocks because of better protection of the tire, while at the same time maintaining the same high level of tire roadholding performance, in particular its ability to develop high cornering or drift thrust.

SUMMARY OF THE INVENTION

One aspect of the invention is directed to a rolling assembly having an axis of rotation and comprising a tire having two beads, a rim, the said adapter providing the connection between one of the beads and the rim, the rim having two rim seats, the adapter having:
- an axially inner end that is intended to be mounted on the rim seat and comprises an inner reinforcing element,
- an axially outer end that comprises an outer reinforcing element,
- a body that connects the said outer end to the said inner end so as to form a single piece and comprises at least one main reinforcement that provides the connection between the said outer reinforce and the said inner reinforcer,
- a substantially cylindrical adapter seat intended to receive one of the said beads, the said seat being situated at the axially outer end of the said body,
- an adapter bearing face substantially contained in a plane perpendicular to the axis of rotation, the said bearing face being situated on the axially inner face of the axially outer end.

The adapter is characterized in that the reinforcing element of the axially outer end is axially situated entirely on the outside of the bearing face, in that the body comprises, facing the adapter seat, an annular seat reinforcement, and in that the rim is made of a material selected from alloys of aluminium and/or of magnesium, composite materials based on carbon fibres, glass fibres, aramid fibres, plant fibres, the said fibres being comprised in a matrix based on thermosetting compounds or on thermoplastic compounds, or of a complex composite containing an elastomer and a complex based on resin and on fibres selected from carbon fibres, glass fibres, aramid fibres, plant fibres or any combinations of these materials.

The annular seat reinforcer and the reinforcing element of the axially outer end are distinct from one another.

The axially outer end of the adapter axially delimits a "housing intended to receive the bead of the tire". The bearing face of the axially outer end serves to support the bead of the tire in the axial direction, in the same way as a rim flange.

In this way, the housing receives the bead of the tire just as the seat of a rim conventionally does. The tire is then immobilized axially by the inflation pressure and is pressed against the bearing face of this axially outer end in the same way as is conventionally done for the bead of a tire against the rim flange of a rim.

The axially inner end of the adapter may be denoted "adapter bead" since it is intended to couple the adapter to the rim flange of a rim in the same way as is conventionally done by the bead of a tire.

Thus, when the rolling assembly according to the invention is in operation and at the operating stresses for which it is designed, the tire is immobilized axially with respect to the rim, more specifically the beads of the tire are immobilized axially with respect to the rim in the same way as for a conventional rolling assembly in which the beads of the tire are mounted directly on the seats of a rim, and the beads of the tire are not immobilized radially with respect to the rim, more specifically the beads of the tire are capable of a degree of radial movement with respect to the rim. Under standard rolling conditions, it may be said that there is virtually no axial deformation of the adapter, or that it is negligible with respect to the radial deformation.

On the other hand, during an impact, the axial deformation of the adapter can be great, thereby contributing to reducing the stresses on the mounted assembly.

The adapter according to the invention has the advantage of having a simple design and being easy to mount. Moreover, owing to the increase in clamping under the beads of the tire, the adapter of the assembly according to the invention makes it possible to prevent the rotation thereof on the adapter under high lateral stress.

Finally, the adapter of the assembly according to the invention has the advantage of significantly reducing the level of mechanical forces towards the chassis in the event of an impact, and thus of making it possible to make the vehicle lighter.

For preference, the fibre-based composite materials contain fibres of a length greater than or equal to 5 mm.

The matrix based on thermosetting compounds is selected from epoxy resins, vinyl ester, unsaturated polyesters, cyanate ester, bismaleimide, acrylic resins, phenolic resins, polyurethanes and combinations thereof.

The matrix based on thermoplastic compounds is selected from polypropylene (PP), polyethylene (PE), polyamides (PAs), semiaromatic polyamides, polyester (PET), polybutylene terephthalate (PBT), polyetheretherketone (PEEK), polyetherketoneketone (PEKK), polyethersulphone (PSU), polyetherimide (PEI), polyimide (PI), polyamideimide (PAI), polyphenylenesulphide (PPS), polyoxymethylene (POM), polyphenylene oxide (PPO).

Preferably, the reinforcing element of the axially outer end is positioned radially on the outside of the bearing face. The body preferably comprises, facing the adapter seat, an annular seat reinforcer.

Preferably, the annular seat reinforcer has a compression modulus greater than or equal to 1 GPa, and preferably greater than 4 GPa, and more preferably greater than 10 GPa. The annular reinforcer may be made up of a core surrounded by an elastomer, or of a succession of layers of elastomer compounds and metal and/or textile reinforcers positioned in any possible combination. The core may comprise at least one element selected from a metal, a composite material, a thermoplastic compound, and a mixture thereof. The composite material may be made from glass fibres embedded in a resin matrix.

The list of elastomers that can be used in the complex compound and in the annular seat reinforcer includes, firstly, rubbers that are crosslinkable by chemical vulcanization reactions by sulphur bridges, by carbon-carbon bonds created by the action of peroxides or of ionizing radiation, by other specific atom chains of the elastomer molecule, secondly, thermoplastic elastomers (TPEs) in which the elastically deformable part forms a network between rather non-deformable "hard" regions, the cohesion of which is the product of physical connections (crystallites or amorphous regions above their glass transition temperature), and next non-thermoplastic elastomers and finally thermosetting resins.

The annular seat reinforcer may be made up of at least two layers of different constituents positioned successively and in alternation. Placed in alternation means successive disposition of a first layer and then a second layer, several times.

The annular seat reinforcer may have an overall axial length greater than or equal to 30% of the width of the bead of the tire, and less than 150% of this same width, and more preferably between 40 and 110% of the width of the bead of the tire.

The annular seat reinforcer may have a mean radial thickness greater than or equal to 0.3 mm and less than or equal to 20 mm depending on the size and the use of the tire. Thus, for a passenger car tire, the thickness is preferably between 0.5 and 10 mm.

The annular seat reinforcer preferably comprises at least one element selected from a metal, a composite material, a thermoplastic compound, and a mixture thereof. This core or this multilayer is preferably contained between two layers of a matrix comprising the choice of an elastomer as cited above, a resin or a mixture thereof.

The annular seat reinforcer preferably consists of a stack of different layers of elastomer compounds with an identical or different chemical nature.

When it is in the form of a stack of layers, the reinforcer preferably has an axial length greater than 5 mm and less than 25 mm and a radial thickness greater than or equal to 0.1 mm and less than or equal to 4 mm Each single element of which the stack of the reinforcer is made may have an axial length greater than 1 mm and less than 25 mm and an identical or different radial thickness greater than or equal to 0.1 mm and less than or equal to 2 mm The annular seat reinforcer may also be in the form of a stack of single threads between a layer of a matrix comprising the choice of an elastomer, a thermoplastic compound, a resin, or a mixture thereof. The single threads may be threads that are conventionally used, such as textile threads (polyester, nylon, PET, aramid, rayon, natural fibres (cotton, flax, hemp)), metal threads, composite threads (carbon, glass-reinforced plastic), or mixtures of these constituents.

The annular seat reinforcer may also be in the form of one or more plies, the reinforcers of which are positioned at an angle of between 0 and 90° with respect to the circumferential direction of the tire.

Preferably, the annular reinforcer may be positioned radially on the outside or radially on the inside of the body of the adapter, on either side of the said body, or else between the plies of reinforcing elements of the body of the adapter.

The outer reinforcing element may consist of metal (steel), nylon, PET or aramid. It may comprise a matrix of resin and/or reinforcing fibres, such as rayon, aramid, PET, nylon, glass fibre, carbon fibre, basalt fibre, poly(ethylene 2,6-naphthalate) (PEN), polyvinyl alcohol (PVA).

The main reinforcement of the said body may have a modulus greater than or equal to 4 GPa; it may consist of metal (steel), of textile cord (rayon, aramid, PET, nylon, glass fibre, carbon fibre, basalt fibre, poly(ethylene 2, 6-naphthalate) (PEN), or polyvinyl alcohol (PVA).

Preferably, the adapter may be positioned on just one side of the rim, and preferably on the outboard side of the vehicle. In this case, the rim has an asymmetrical geometric shape so as to adapt to the presence of the adapter on just one side.

When the mounted assembly comprises two adapters, the latter may be symmetrical or non-symmetrical. The concept of symmetry or asymmetry of the adapter is defined by the axial length of the body of the adapter. Two adapters are asymmetrical when the body of one of them has an axial length greater than that of the other.

Preferably, the rolling assembly according to the invention comprises a first and a second adapter that each have a body with a different or identical length.

The adapter comprises at least one, removable or otherwise, conducting strip positioned over all or part of the circumferential periphery of the said adapter, and over a complete path extending from the adapter bearing face to the rim J. The presence of the conducting strip also makes it possible to ensure the conduction of electricity between the ground and the wheel, and therefore between the ground and the vehicle notably when the conductivity of the elastomeric compositions is insufficient, this being all the more important as the tire rests not directly on the wheel but against an adapter.

For preference, when the conducting strip is removable or irremovable, it is positioned entirely at the radially external surface of the body.

For preference, when the conducting strip is irremovable, it is partially buried under the radially external surface of the body.

For preference, the conducting strip has an electrical resistivity less than or equal to $10^8$ Ohm.cm, and preferably less than or equal to $10^7$ Ohm.cm.

For preference, the conducting strip is made up, as desired, from a metallic leaf or from an elastomeric composition containing carbon black in a quantity greater than or equal to 15%.

For preference, the carbon black in the elastomeric composition has a specific surface area greater than or equal to 500 $m^2$/g.

For preference, when the conducting strip is irremovable, it is bonded or crosslinked to the elastomeric composition of the body.

BRIEF DESCRIPTION OF THE DRAWINGS

The invention will now be described with the aid of examples and figures which follow and which are given purely by way of illustration, and in which.

DETAILED DESCRIPTION OF THE DRAWINGS

Figure 1:
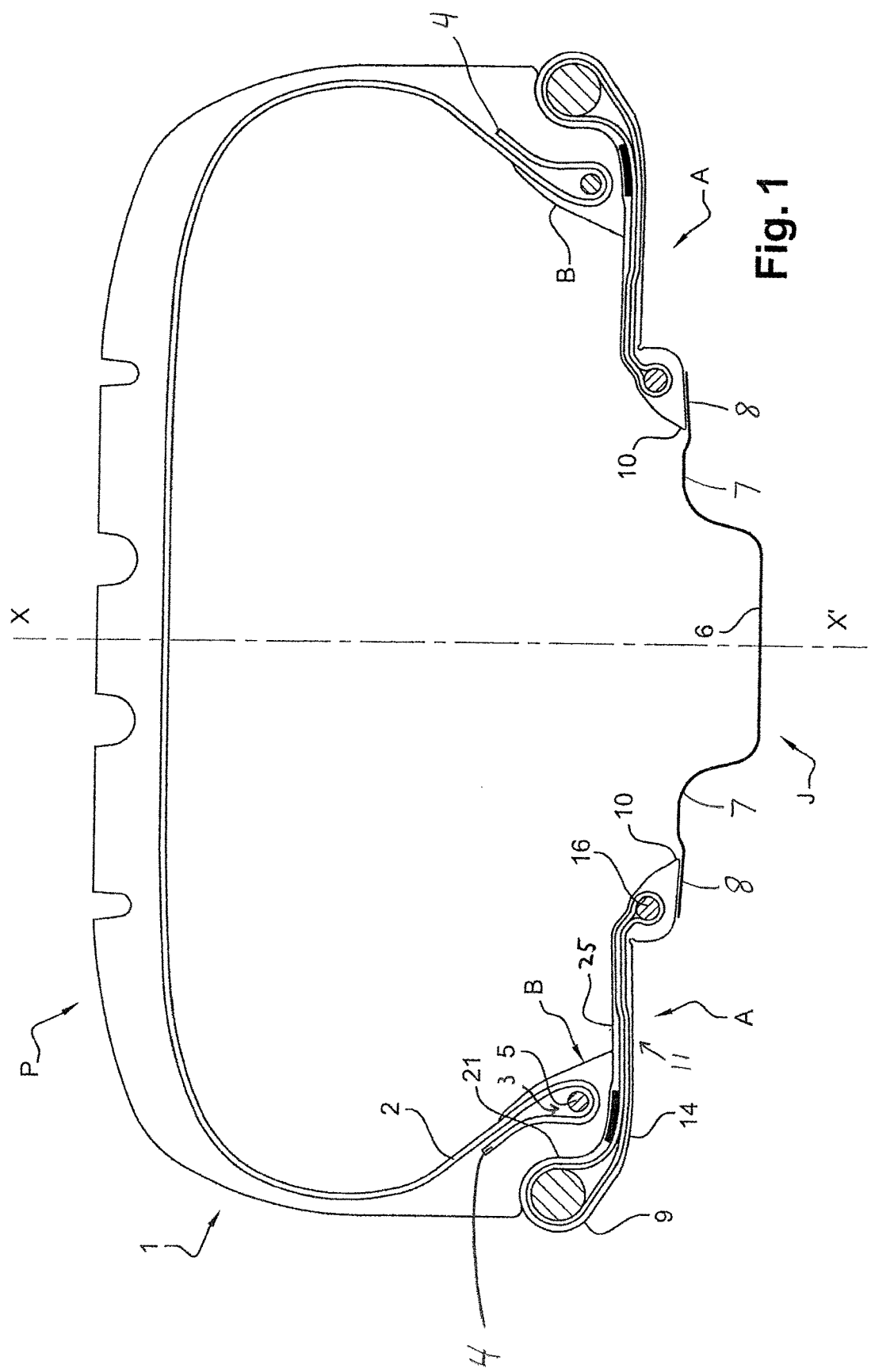
FIG. 1 schematically shows, in radial section, a rolling assembly according to an embodiment of the invention, comprising a tire mounted on two adapters, which are themselves fitted onto a rim in a removable manner.

FIG. 1 shows a rolling assembly which comprises a tire P (partially shown), an adapter A and a rim J.

The tire of which the design per se is unaltered in the invention, consists of a tread reinforced by a crown reinforcement joined to two beads B on either side of an equatorial plane XX' by way of two sidewalls 1. A carcass reinforcement 2 that mainly reinforces the sidewalls 1 is anchored in each bead B to at least one bead wire 3, in this case of the "braided" type, so as to form turn-ups 4 that are separated from the main part of the carcass reinforcement by profiled elements 5 having a quasi triangular shape.

It is important to note that the invention can be implemented with a very large number of types of tire, be they radial tires or cross-ply tires, or even with tires of the type having self-supporting sidewalls.

The rim J, which is made of carbon/epoxy composite, comprises a well 6, known as a mounting well, that connects, on either side of the equatorial plane, two rim seats 7 that are axially extended by rim flanges 8, the radially outer edges of which are curved.

The adapter A mainly comprises an axially outer end 9, an axially inner end 10 and a body 11 connecting the said end 9 to the said end 10.

The axially outer end 9 comprises an outer reinforcing element 20 made up of a first portion 20a that is connected to a second portion 20b that between them form a substantially perpendicular angle. During the mounting of the tire, the bead seat for the bead B is fitted into the space created by this outer reinforcing element 20.

The adapters of this FIG. 1 are removable from the rim J and the beads B of the tire.

The adapter A, which is positioned at each bead B of the tire, may be symmetrical or non-symmetrical. Symmetry means that the overall length of the body 11 is identical on both adapters. When the assembly (tire, rim and adapter) is mounted, the beads B of the tire are positioned on the adapter seat 14 and made to bear axially against a bearing face 21.

Figure 2:
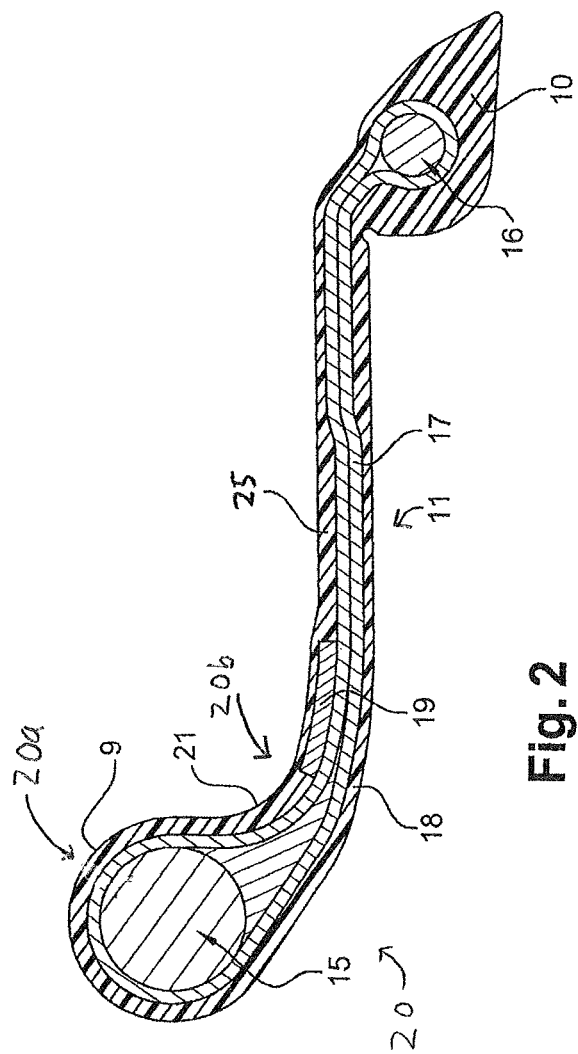
FIG. 2 shows a schematic view, in radial section, of a non-mounted adapter according to an embodiment of the invention.

FIG. 2 shows an adapter according to the invention which is not mounted on a rim. This adapter comprises, on one hand, an axially outer end 9 with an outer reinforcer 15 having a substantially spherical geometric shape in section, consisting of a composite material such as glass-fibre-reinforced plastic, and, on the other hand, an axially inner end 10 with a metal reinforcer 16, and finally a body 11 made up of two plies 17 that comprise textile cords. The cords of each ply are mutually parallel. On the one hand, the said plies 17 are attached axially on the inside and radially on the outside to the walls of the reinforcer 15, and on the other hand, they are anchored, in the end 10, to the metal reinforcer 16, such as a bead wire, forming a turn-up at each end.

The body 11 comprises a substantially cylindrical adapter seat 18 that is intended to receive a bead of the tire (see FIG. 2) that is positioned at the axially outer end of the body 11.

The body 11 also comprises an adapter bearing face 21 that is contained substantially in a plane perpendicular to the axis of rotation, is situated on the axially inner face of the axially outer end, and is intended to keep the bead in place in its housing. This adapter seat 18 comprises an annular seat reinforcer 19 that has a compression modulus equal to 100 GPa. According to the depiction in this FIG. 2, the entirety of the reinforcer 19 is positioned at the radially outer surface of the surface of the body 11.

The annular seat reinforcer 19 is not secured to the outer reinforcer 15. These two reinforcers 19, 15 are entirely independent of one another.

The reinforcer 19 is made up of a tri-layer comprising metal reinforcers in the form of wires, alternating with an elastomer of the rubber-resin type. The reinforcer 19 has a radial thickness of about 1.5 mm and an axial length of about 15 mm The elastomer layer of the reinforcer 19 has a radial thickness of about 0.3 mm and an axial length of about 15 mm A layer of elastomer 25 covers all of the elements that make up the adapter, namely the reinforcer 15, the reinforcer 16, the body 11 and the radially outer surface of the reinforcer 19.

The following examples show the results obtained with the adapter according to the invention.

EXAMPLE

Kerb Knock Tests

This test consists in causing a mounted assembly to mount a kerb at an angle of attack of 30°. The choice of this angle is based on the fact that it constitutes very harmful stress for a tire. The test is carried out with two different kerb heights (90 mm and 110 mm), and the procedure is as follows: Several passes of the wheel at different speeds are carried out until the tire is punctured. The starting speed is 20 km/h and then the speed is incremented by 5 km/h on each new pass.

A conventional assembly without an adapter and with a conventional steel rim (control 1) is compared against an assembly equipped with an adapter according to document WO 00/78565 (control 2) and an assembly according to the invention equipped with an adapter and with a rim made of composite according to the invention (invention). These assemblies are all of the size 205/55R16 comprising a 6.5J16 rim.

The results are collated in the following Table I and are given in percent:

TABLE I

|  | Control 1 | Control 2 | Invention |
| --- | --- | --- | --- |
| Percentage of the puncturing speed compared with control - kerb height 90 mm | 100 | >150 | >150 |
| Level of vertical thrust force (Fz) recorded at the puncturing speed | 100 | 50 | 40 |
| State of the mounted assembly following the impacts | Tire punctured Wheel marked | Tire and wheel intact Adapter plastically deformed | Tire, adapter and wheel intact |

Results greater than 100 show an improvement in behaviour when subjected to a lateral knock.

The test carried out at the kerb height of 90 mm led to the puncturing of the control tire at a speed of 30 km/h, whereas the assembly according to the invention did not suffer any damage at the same speed, or even at a speed of 50 km/h.

The test carried out at the kerb height of 110 mm led to the puncturing of the control tire at a speed of 20 km/h, whereas the assembly according to the invention did not suffer any damage at the same speed, or even at a speed of 50 km/h.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A rolling assembly having an axis of rotation and comprising:
    a tire having two beads;
    a rim;
    an adapter coupled between one of the beads and the rim, said rim having two rim seats,
    said adapter having:
    an axially inner end that is adapted to be mounted on one of the rim seats and comprises a metal inner reinforcing element,
    an axially outer end that comprises an outer reinforcing element having a spherical geometric shape in section,
    a body that connects said axially outer end to said axially inner end and provides a connection between said outer reinforcing element and said inner reinforcing element,
    a substantially cylindrical adapter seat adapted to receive one of said beads of the tire, said seat being situated at an axially outer portion of said body,
    an adapter bearing face substantially contained in a plane perpendicular to the axis of rotation, said adapter bearing face being situated on an axially inner face of the axially outer end,
    wherein the outer reinforcing element is axially situated entirely on the outside of the bearing face, wherein the body comprises, facing the adapter seat, an annular seat reinforcement, wherein the annular seat reinforcement and the outer reinforcing element of the axially outer end are distinct from one another, and wherein the rim is made of a material selected from the group of:
    (1) alloys of aluminium and/or of magnesium,
    (2) composite materials based on carbon fibres, glass fibres, aramid fibres, plant fibres, said fibres being comprised in a matrix based on thermosetting compounds or on thermoplastic compounds, or of a composite containing an elastomer, and
    (3) a composite comprising resin and fibres selected from the group of: (a) carbon fibres, (b) glass fibres, (c) aramid fibres, (d) plant fibres, and (e) any combinations of materials (a), (b), (c) and (d).

2. The rolling assembly according to claim 1, wherein the fibre-based composite materials comprise fibres of a length greater than or equal to 5 mm.

3. The rolling assembly according to claim 1, wherein the matrix based on thermosetting compounds is selected from one or more from the group of: epoxy resins, vinyl ester, unsaturated polyesters, cyanate ester, bismaleimide, acrylic resins, phenolic resins, and polyurethanes.

4. The rolling assembly according to claim 1, wherein the matrix based on themioplastic compounds is selected from one or more from the group of: polypropylene (PP), polyethylene (PE), polyamides (PAs), semiaromatic polyamides, polyester (PET), polybutylene terephthalate (PBT), polyetheretherketone (PEEK), polyetherketoneketone (PEKK), polyethersulphone (PSU), polyetherimide (PEI), polyimide (PI), polyamideimide (PAI), polyphenylenesulphide (PPS), polyoxymethylene (POM), and polyphenylene oxide (PPO).

5. The rolling assembly according to claim 1, wherein the outer reinforcing element is positioned radially on the outside of the adapter seat.

6. The rolling assembly according to claim 1, wherein the annular seat reinforcement has a compression modulus greater than or equal to 1 GPa.

7. The rolling assembly according to claim 1, wherein the composite material comprises glass fibres embedded in a resin material.

8. The rolling assembly according to claim 1, wherein the annular seat reinforcement has an overall axial length greater than or equal to 30% of the width of the bead of the tire, and less than 150% of this same width.

9. The rolling assembly according to claim 8, wherein the annular seat reinforcement has an axial length of between 40 and 110% of the width of the bead of the tire.

10. The rolling assembly according to claim 1, wherein the annular seat reinforcement has a mean radial thickness greater than or equal to 0.3 mm and less than or equal to 20 mm.

11. The rolling assembly according to claim 1, wherein the annular seat reinforcement has a compression modulus greater than 10 GPa.

* * * * *